(12) United States Patent
Tanae et al.

(10) Patent No.: US 8,444,518 B2
(45) Date of Patent: May 21, 2013

(54) DRIVE DEVICE

(75) Inventors: Masahiro Tanae, Okazaki (JP); Tomoo Atarashi, Kariya (JP); Natsuki Sada, Anjo (JP); Tomohiko Ito, Anjo (JP); Manabu Miyazawa, Anjo (JP); Hiromichi Agata, Nishio (JP); Tatsuyuki Uechi, Toyoake (JP)

(73) Assignee: Aisin AW Co., Ltd., Anjo (JP)

( * ) Notice: Subject to any disclaimer, the term of this patent is extended or adjusted under 35 U.S.C. 154(b) by 299 days.

(21) Appl. No.: 12/989,082

(22) PCT Filed: Aug. 25, 2009

(86) PCT No.: PCT/JP2009/065147
§ 371 (c)(1),
(2), (4) Date: Oct. 22, 2010

(87) PCT Pub. No.: WO2010/024429
PCT Pub. Date: Mar. 4, 2010

(65) Prior Publication Data
US 2011/0039649 A1 Feb. 17, 2011

(30) Foreign Application Priority Data
Aug. 29, 2008 (JP) ................................. 2008-222321

(51) Int. Cl.
*F16H 3/72* (2006.01)
*F16H 37/06* (2006.01)
(52) U.S. Cl.
USPC .............................................. 475/5; 475/903
(58) Field of Classification Search
USPC .......................................................... 475/5
See application file for complete search history.

(56) References Cited

U.S. PATENT DOCUMENTS 5,643,119 A * 7/1997 Yamaguchi et al. .............. 475/5
6,166,498 A 12/2000 Yamaguchi et al.
(Continued)

FOREIGN PATENT DOCUMENTS

EP 0 769 403 A2 4/1997
EP 0 791 495 A2 8/1997
(Continued)

OTHER PUBLICATIONS

Jul. 31, 2012 Partial Translation of Office Action issued in Korean Patent Application No. 10-2010-7024472.

(Continued)

*Primary Examiner* — David D Le
*Assistant Examiner* — Colby M Hansen
(74) *Attorney, Agent, or Firm* — Oliff & Berridge, PLC

(57) ABSTRACT

A drive device includes: an input shaft connected to an engine; a first motor-generator; a second motor-generator; a planetary gear unit including three rotating elements; an output gear connected to the planetary gear unit; an output shaft that transmits rotation of the output gear to a driving wheel; and a control device that controls at least one of the first and second motor-generator. The output gear, the planetary gear unit, and the first motor-generator are coaxial with the input shaft. The planetary gear unit is provided radially inside the first motor-generator and is provided at the same position as the first motor-generator in the axial direction. The second motor-generator is provided on an axis different from the input shaft and the output shaft axes. The control device is provided on the side of the output gear, the planetary gear unit, and the first motor-generator that is opposite the input shaft.

17 Claims, 4 Drawing Sheets

U.S. PATENT DOCUMENTS

| | | | |
|---|---|---|---|
| 6,692,394 B2 * | 2/2004 | Takenaka | 475/5 |
| 6,896,080 B2 * | 5/2005 | Takenaka | 180/65.235 |
| 7,033,296 B2 * | 4/2006 | Takenaka | 475/5 |
| 7,100,721 B2 * | 9/2006 | Atarashi et al. | 180/65.235 |
| 7,166,050 B2 * | 1/2007 | Schmidt et al. | 475/5 |
| 7,189,177 B2 * | 3/2007 | Takasu et al. | 475/5 |
| 7,448,975 B2 | 11/2008 | Reisch et al. | |
| 7,679,238 B2 | 3/2010 | Nomura et al. | |
| 2006/0201277 A1 | 9/2006 | Reisch et al. | |
| 2008/0121446 A1 | 5/2008 | Sanji | |
| 2009/0114462 A1 | 5/2009 | Tahara et al. | |

FOREIGN PATENT DOCUMENTS

| | | |
|---|---|---|
| EP | 1 000 790 A2 | 5/2000 |
| JP | A-2000-217205 | 8/2000 |
| JP | A-2006-254690 | 9/2006 |
| JP | A-2007-124764 | 5/2007 |
| KR | 2007-0020234 A | 2/2007 |
| KR | 10-0774659 | 11/2007 |

OTHER PUBLICATIONS

English-language translation of Oct. 24, 2012 Office Action issued in Chinese Patent Application No. 200980115175.4.

International Search Report for International Patent Application No. PCT/JP2009/065147, mailed on May 26, 2010.

Written Opinion for International Patent Application No. PCT/JP2009/065147, mailed on May 26, 2010.

\* cited by examiner

F I G . 2
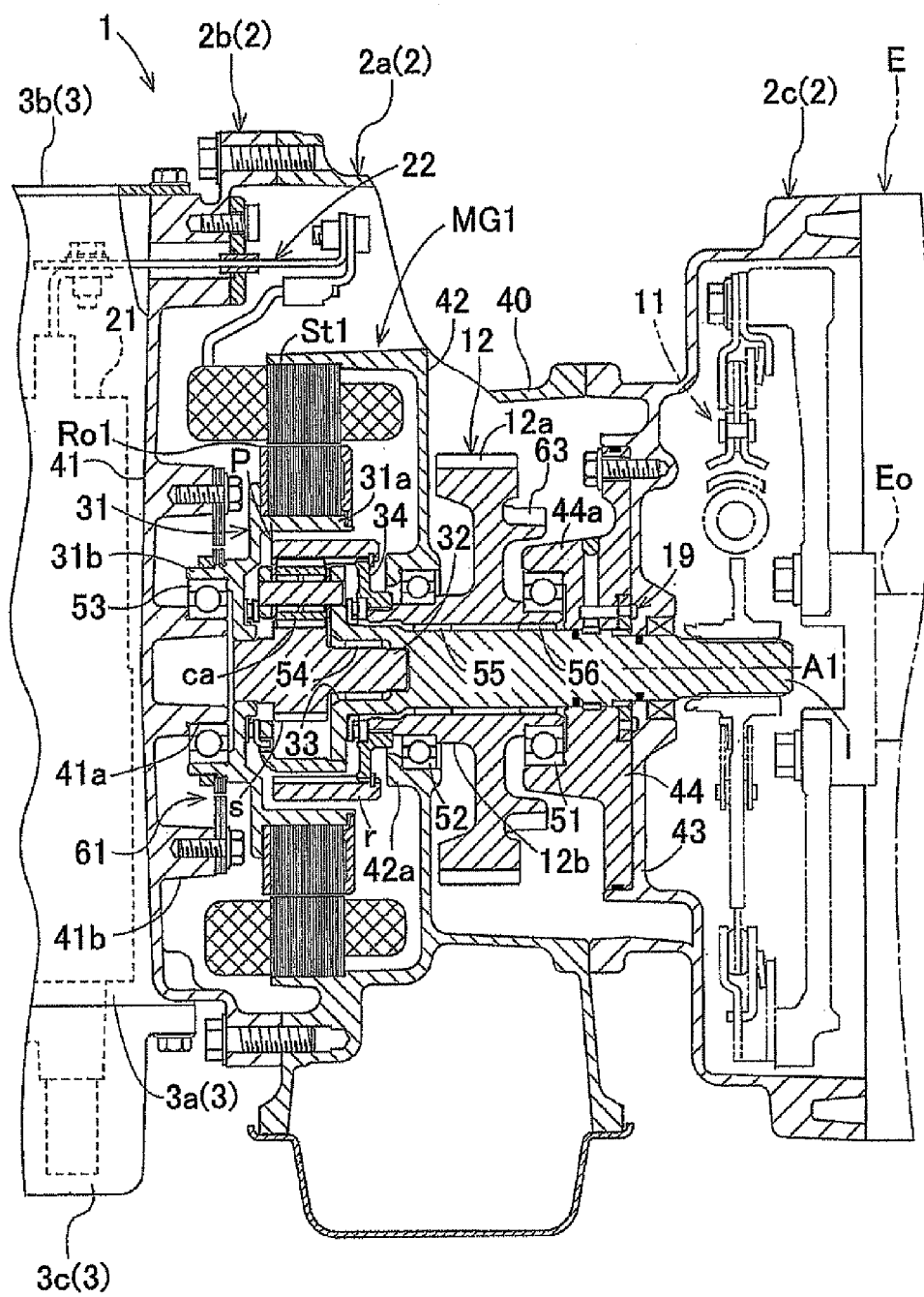

DRIVE DEVICE

BACKGROUND OF THE INVENTION

1. Field of the Invention

The present invention relates to a drive device for use in vehicles having rotating electrical machines that serve as a driving force source and a planetary gear unit.

2. Description of the Related Art

In recent years, hybrid vehicles, which are include an engine and rotating electrical machines, such as a generator and a motor, as a driving force source of a vehicle, have attracted attention in terms of fuel economy, environmental protection, and the like. Drive devices for hybrid vehicles generally require a control device for controlling the rotating electrical machines. Because the rotating electrical machines and the control device, which are operated in combination, are connected by connection members such as power cables, it is desirable, for convenience of installation in a vehicle, to integrate the rotating electrical machines and the control device in a unitary case. Accordingly, drive devices commonly use a structure in which an inverter case accommodating a control device is integrally provided on top of a drive device case accommodating two rotating electrical machines, a differential gear unit, and the like.

In such a structure of the drive devices, however, because the control device is provided on top of the drive device case, the overall vertical dimension of the drive device is increased. Thus, installing such a drive device on a vehicle requires the relocation of equipment such as a battery and an air cleaner, which are usually provided above the drive device, to other positions in order to prevent interference of such equipment with the control device.

In view of this problem, Japanese Patent Application Publication No. JP-A-2007-124764 (JP-A-2007-124764), for example, describes a drive device having the following structure. The drive device includes: an input shaft connected to an engine; two rotating electrical machines; a planetary gear unit having three rotating elements that are respectively connected to one of the rotating electrical machines, the input shaft, and an output rotating element; and a control device that controls the rotating electrical machines. Regarding the arrangement of the components included in this drive device, JP-A-2007-124764 describes a structure in which the two rotating electrical machines, the planetary gear unit, and the input shaft are provided coaxially, and the control device is provided above the drive device. The control device is provided radially outside one of the rotating electrical machines. Thus, a condenser and a reactor, which are relatively large components among the components of the control device, are provided opposite each other with respect to a vertical plane extending through the rotation axis of the rotating electrical machine, whereby these relatively large components can be efficiently accommodated in a drive device case. This structure thus suppresses increases in the height of the drive device.

In the drive device as described in JP-A-2007-124764, however, two rotating electrical machines are provided coaxially. Thus, the axial length of the rotating electrical machines need to be increased in order to increase the rotational driving force that can be output from the rotating electrical machines, while suppressing the dimensional increase in height of the drive device. This increases the axial length of the drive device. That is, in conventional drive devices, integrating the control device necessarily increases either the overall height or the axial length of the drive device, thus increasing the overall size of the drive device.

SUMMARY OF THE INVENTION

The invention provides a technique for integrating a control device that also minimizes the increase in overall size of a drive device.

A drive device according to a first aspect of the present invention includes: an input shaft connected to an engine; a first rotating electrical machine; a second rotating electrical machine; a planetary gear unit including a first rotating element connected to the first rotating electrical machine, a second rotating element connected to the input shaft, and a third rotating element that serves as an output rotating element; an output gear connected to the output rotating element; an output shaft that transmits rotation of the output gear to a driving wheel; and a control device that controls at least one of the first rotating electrical machine and the second rotating electrical machine. In this drive device, the output gear, the planetary gear unit, and the first rotating electrical machine are provided coaxially with the input shaft, the planetary gear unit is provided radially inside the first rotating electrical machine, and is provided at the same position as at least a part of the first rotating electrical machine in the axial direction, the second rotating electrical machine is provided on an axis different from respective axes of the input shaft and the output shaft, and the control device is more distal from an end of the input shaft connected to the engine than the output gear, the planetary gear unit, and the first rotating electrical machine are in an axial direction.

Note that, in the present application, the term "rotating electrical machine" is used as a concept including a motor (an electric motor), a generator (an electric generator), and a motor-generator functioning both as a motor and a generator as needed. In the present specification, the "rotating electrical machine" is used as a general concept meaning one or both of the first rotating electrical machine and the second rotating electrical machine, unless used specifically.

The term "connected" in the first aspect is used as a concept including not only direct connection between members, but also indirect connection between members through one or more members.

According to the above structure of the first aspect, the axial length of a region, which is occupied by the components provided coaxially with the input shaft of the drive device, (hereinafter sometimes referred to as the "axial length") may be reduced by the amount corresponding to the axial length of the second rotating electrical machine that is provided on a different axis from that of the input shaft, and the amount corresponding to the axially overlapping length of the planetary gear unit and the first rotating electrical machine. Thus, a space corresponding to the amount of reduction in axial length results on the opposite side of the output gear, the planetary gear unit, and the first rotating electrical machine from the end of the input shaft connected to the engine in the axial direction. Thus, by providing the control device in this space, the space produced by reducing the axial length can be effectively used, whereby the control device can be integrated into the drive device while suppressing an increase in overall size of the drive device.

The control device may be provided at a position that overlaps the first rotating electrical machine when reviewed in an axial direction of the first rotating electrical machine.

The first rotating electrical machine generally has the largest outer diameter among the output gear, the planetary gear unit, and the first rotating electrical machine, which are provided coaxially with the input shaft. Thus, reducing the axial length produces a space at a position that overlaps the first rotating electrical machine when viewed in the axial direction of the first rotating electrical machine. According to the above structure, the control device is appropriately provided in this space, whereby an increase in overall size of the drive device can be suppressed.

The control device may be provided at a position that does not overlap the second rotating electrical machine when viewed in the axial direction of the second rotating electrical machine.

In the case where the second rotating electrical machine has a large axial length and the control device overlaps the second rotating electrical machine when viewed in the axial direction, the overall axial length of the drive device is increased. According to the above structure, the control device is appropriately provided, whereby the space may be effectively used, and the overall axial length of the drive device is reduced.

The control device may be provided radially outside the second rotating electrical machine and at the same position as at least a part of the second rotating electrical machine in the axial direction of the second rotating electrical machine.

According to this structure, the overall axial length of the drive device including the control device may be reduced by the amount corresponding to the axially overlapping length of the control device and the second rotating electrical machine.

The output gear and the planetary gear unit may be sequentially arranged in this order from the end of the input shaft connected to the engine. A rotor of the first rotating electrical machine may be connected to a sun gear of the planetary gear unit, and a fixing member is attached to the rotor on the side of the rotor that is distal from the end of the input shaft connected to the engine, and rotatably supports the rotor. The sun gear may be supported by the input shaft so as to be rotatable relative to the input shaft.

According to this structure, because one end of the rotor of the first rotating electrical machine is supported by the fixing member, a shaft core of the rotor can be located with high accuracy. Moreover, because the other end of the rotor of the first rotating electrical machine is supported by the input shaft through the sun gear of the planetary gear unit connected to the rotor, the rotor of the first rotating electrical machine may be compactly supported by using a bearing of a relatively small diameter at a position close to a shaft core of the input shaft. The use of the bearing of a relatively small diameter reduces the cost of the bearing, whereby the total cost of the drive device can be reduced.

The sun gear may include an extended shaft portion that extends toward the end of the input shaft connected to the engine in the axial direction of the input shaft, and the extended shaft portion is supported radially inside the input shaft so as to be rotatable relative to the input shaft.

According to this structure, the rotor of the first rotating electrical machine may be supported with a large gap on both axial sides of the planetary gear unit. Thus, the shaft core of the rotor can be located with high accuracy.

The drive device may further include an intermediate fixing member provided between the output gear and the planetary gear unit in the axial direction. The input shaft may extend through the output gear, may be supported radially inside the output gear so as to be rotatable relative to the output gear, and may be connected to a carrier of the planetary gear unit. The output gear may be connected radially outside the input shaft to a ring gear of the planetary gear unit through a connection portion, and may be rotatably supported radially outside the connection portion by the intermediate fixing member.

According to this structure, since one end of the output gear is supported by the intermediate fixing member, a shaft core of the output gear can be located with high accuracy. Moreover, since the input shaft is supported radially inside the output gear for which high accuracy of the shaft core is ensured, relatively high accuracy of a shaft core of the input shaft can also be ensured.

The drive device may further include: a differential gear unit having a differential input gear, for transmitting a rotational driving force of the differential input gear to the output shaft; and a first gear that meshes with the output gear, a second gear that meshes with the differential input gear, and a counter shaft that connects the first gear to the second gear. The counter shaft may be provided on an axis different from respective rotation axes of the input shaft, the output shaft, and the second rotating electrical machine.

According to this structure, the gear ratio when transmitting the rotational driving force of the output gear to the output shaft through the differential gear unit may be arbitrarily set by changing, as appropriate, the ratio of the diameter and the number of teeth of the first gear that meshes with the output gear to the diameter and the number of teeth of the second gear that meshes with the differential input gear.

An output gear of the second rotating electrical machine connected to a rotor of the second rotating electrical machine may mesh with the first gear.

According to this structure, because the output gear and the second rotating electrical machine output gear both mesh with the first gear, the axial length of the counter shaft may be reduced. Thus, the first rotating electrical machine may be provided closer to the end of the input shaft connected to the engine by the amount corresponding to the reduction in axial length of the counter shaft. As a result, the axial length of the drive device is reduced, whereby a larger space for providing the control device can be ensured.

The second gear and the end of the input shaft which is connected to the engine may be provided on one side of a vertical plane, which is perpendicular to the counter shaft, and the first gear may be provided on the other side of the vertical plane.

According to this structure, the counter gear can be provided closer to the end of the input shaft connected to the engine, whereby the first rotating electrical machine can be provided closer to the end of the input shaft connected to the engine. As a result, the axial length of the drive device is reduced and yields greater space for the control device.

If the second gear is located at a position that is more proximal to the end of the input shaft connected to the engine than the first gear is, the drive device may further include an oil pump that generates an oil pressure for supplying a lubricant to a portion to be lubricated, and the oil pump may be provided on the same axis as the input shaft and at a position that is more proximal to the end of the input shaft connected to the engine than the output gear is.

Because the output gear meshes with the first gear, and the second gear is provided at a position that is more proximal to the end of the input shaft connected to the engine than the first gear is in the axial direction, a space that is on the plane, which is perpendicular to the input shaft and on which the second gear is present, is formed at a position which is more proximal to the end of the input shaft connected to the engine than the output gear is, in the axial direction of the input shaft. By using the above structure, the oil pump is provided by effectively using this space, whereby the overall size of the drive device may be reduced, and the lubricant may be supplied to the portion to be lubricated.

In an axial direction of an output shaft in the differential gear unit, the differential input gear and the end of the input shaft connected to the engine may be provided on one side of a vertical plane, which is perpendicular to the output shaft of the differential gear unit, and on which an axial central portion of the differential gear unit is present.

According to this structure, the second gear that meshes with the differential input gear may be provided closer to the end of the input shaft connected to the engine. Thus, the counter shaft and the first gear, which are connected to the second gear, the output gear, which is connected to the first gear, may be provided closer to the end of the input shaft connected to the engine in the axial direction. As a result, the axial length of the drive device is reduced, thereby allowing greater space for the control device.

The output shaft and a rotational axis of the second rotating electrical machine may be provided on one side of a vertical plane which includes the input shaft.

According to this structure, in a structure having three axes, that is, the axis of the input shaft, the rotation axis of the second rotating electrical machine, and the axis of the output shaft, each axis may be compactly arranged and thereby suppress an increase in the overall size of the drive device.

The control device may include an inverter unit for performing conversion between direct current power and alternating current power.

According to this structure, by using the inverter unit, the rotating electrical machines may be appropriately driven by obtaining electric power from an electricity accumulating device such as a battery, or electric power generated by driving the rotating electrical machines may be appropriately accumulated in the electricity accumulating device.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a cross-sectional view of the main components of the drive device according to the embodiment of the present invention;

DETAILED DESCRIPTION OF THE EMBODIMENTS

Figure 1:
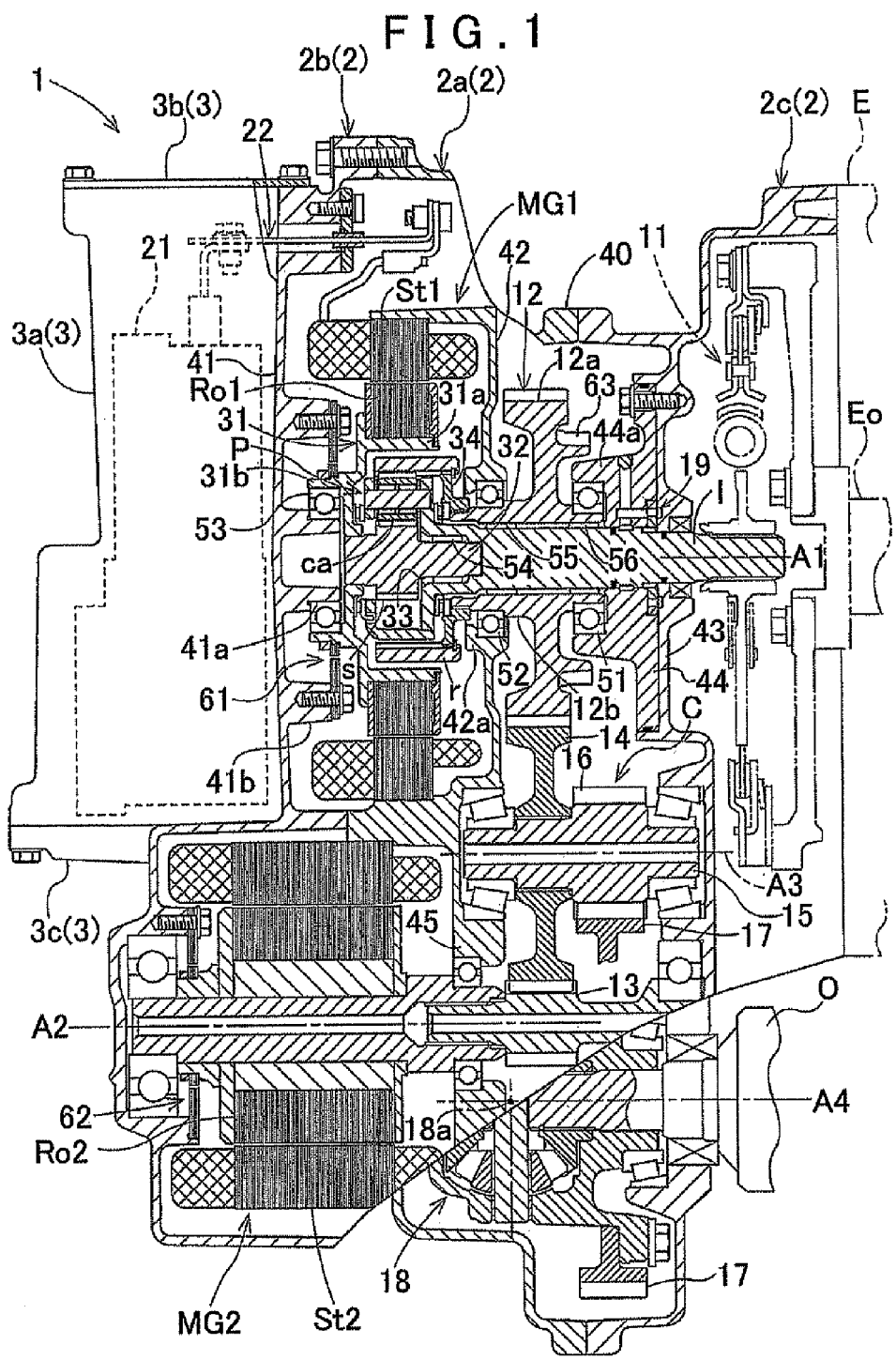
FIG. 1 is a cross-sectional view of a drive device according to an embodiment of the present invention.
Figure 3:
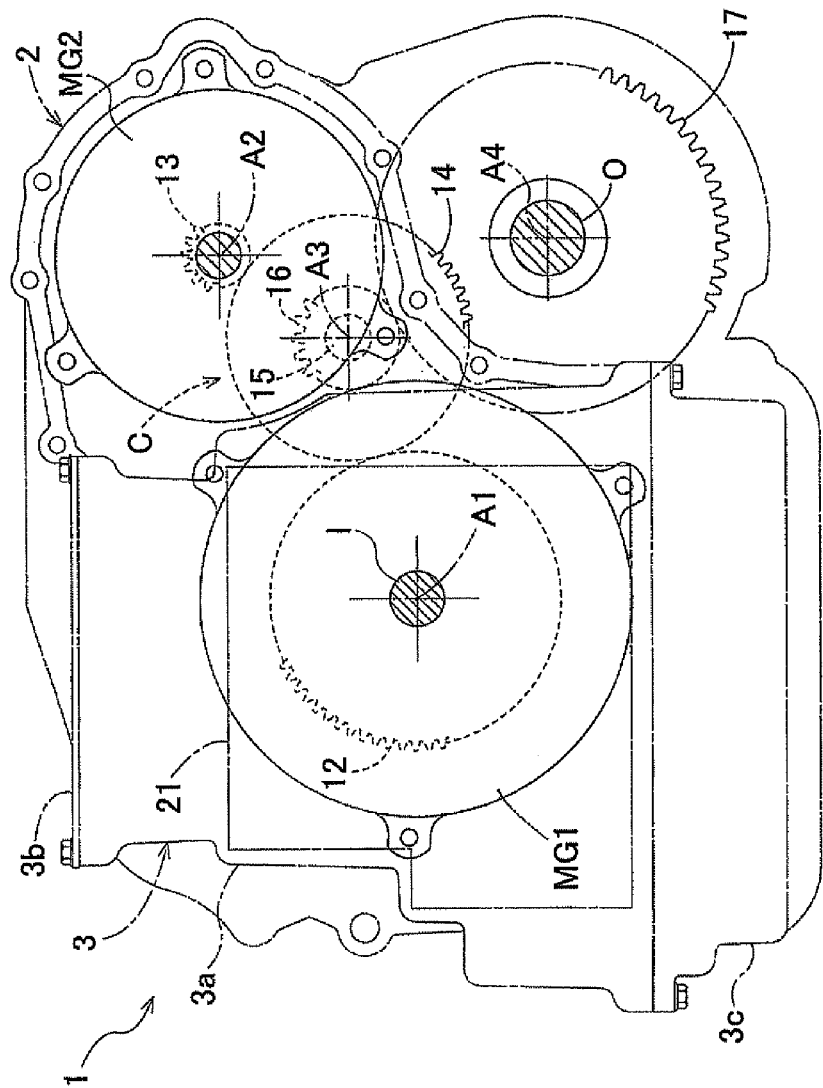
FIG. 3 is an axial view of the drive device according to the embodiment of the present invention.
Figure 4:
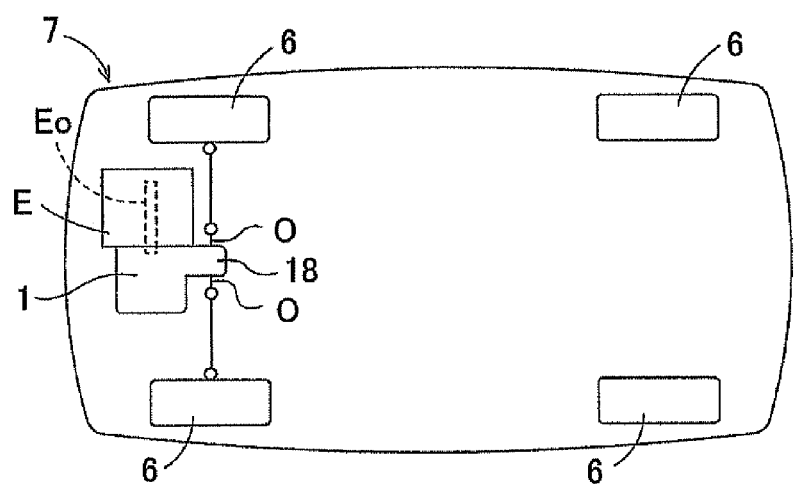
FIG. 4 is a diagram schematically showing arrangement of the drive device in a vehicle.

Hereinafter, an embodiment of a drive device according to the present invention will be described with reference to the accompanying drawings. The present embodiment will be described with respect to an example in which the drive device of the present invention is applied to a hybrid drive device 1 of an FF (Front Engine Front Drive) vehicle. FIG. 1 is a cross-sectional view of the hybrid drive device 1 according to the present embodiment. FIG. 2 is a cross-sectional view of the main components of the hybrid drive device 1 according to the present embodiment. FIG. 3 is an axial view of the drive device according to the embodiment of the present invention. FIG. 4 is a diagram schematically showing arrangement of the hybrid drive device 1 in a vehicle 7.

1. Overall Structure of the Hybrid Drive Device

First, the overall structure of the hybrid drive device 1 of the present embodiment will be described. The hybrid drive device 1 is provided in a hybrid vehicle that uses both an engine E and a motor-generator MG as a driving force source of the vehicle 7. As shown in FIG. 4, the hybrid drive device 1 of the present embodiment is provided adjacent to the engine E, which is transversely mounted in the vehicle C, in a width direction of the vehicle 7, and is connected to an engine output shaft Eo. A rotational driving force applied from the engine output shaft Eo (or a rotational driving force generated by the motor-generator MG) is transmitted to driving wheels 6 through an output shaft O of the hybrid drive device 1, thereby enabling the vehicle 7 to move. Note that, in the illustrated example, the output shaft O is provided rearward of the engine output shaft Eo (an input shaft I of the hybrid drive device 1 (see FIG. 1)) in a longitudinal direction of the vehicle 7. However, the output shaft O may be provided forward of the engine output shaft Eo (the input shaft I of the hybrid drive device 1).

As shown in FIG. 1, the hybrid drive device 1 includes: the input shaft I connected to the engine E; a first motor-generator MG1; a second motor-generator MG2; a planetary gear unit P; an output gear 12 connected to a ring gear r serving as an output rotating element of the planetary gear unit P; the output shaft O for transmitting rotation of the output gear 12 to the driving wheels 6; and a control device 21 for controlling the first motor-generator MG1 and the second motor-generator MG2. The hybrid drive device 1 forms an electric continuously variable transmission for controlling rotation of the first motor-generator MG1 to continuously shift the rotational driving force of the input shaft through the planetary gear unit P, and to transmit the shifted rotational driving force to the output gear 12. In the present embodiment, the rotational driving force transmitted to the output gear 12 is transmitted to the output shaft O through a counter deceleration mechanism C and a differential unit 18. Moreover, the second motor-generator MG2 is configured to transmit the rotational driving force to the output shaft O through the counter deceleration mechanism C and the differential unit 18. In the present embodiment, the first motor-generator MG1 can be regarded as a "first rotating electrical machine" in the present invention, and the second motor-generator MG2 can be regarded as a "second rotating electrical machine" in the present invention. Moreover, the differential unit 18 may functions as the "differential gear unit" of the present invention.

The input shaft I, the first motor-generator MG1, the second motor-generator MG2, the planetary gear unit P, the output gear 12, the counter deceleration mechanism C, the differential unit 18, and the output shaft O, which form the hybrid drive device 1, are accommodated in a case 2. The output gear 12, the planetary gear unit P, and the first motor-generator MG1 are coaxial with the input shaft I. The second motor-generator MG2, the counter deceleration mechanism C, and the differential unit 18 are provided parallel to each other on different axes from the input shaft I. That is, this hybrid drive device 1 has a four-axis structure including a first axis A1 on which the input shaft I, the planetary gear unit P, the first motor-generator MG1, and the output gear 12 are provided, a second axis A2 on which the second motor-generator MG2 is provided, a third axis A3 on which the counter deceleration mechanism C is provided, and a fourth axis A4 on which the differential unit 18 is provided.

As shown in FIG. 3, in the longitudinal direction of the vehicle 7 (the left-right direction in FIG. 3), the second axis A2, the third axis A3, and the fourth axis A4 are positioned on the same side with respect to a vertical plane extending though the first axis A1. The second axis A2, the third axis A3, and the fourth axis A4 are positioned toward the rear side of the vehicle 7 with respect to the vertical plane extending through the first axis A1. Moreover, in the vertical direction of the vehicle 7 (the up-down direction in FIG. 3), the second axis A2 and the fourth axis A4 are positioned above and below a horizontal plane extending through the first axis A1, respectively. The second axis A2 is positioned above the horizontal plane extending through the first axis A1, and the fourth axis A4 is positioned below the horizontal plane extending through the first axis A1. Thus, the first axis A1, the second axis A2, and the fourth axis A4 are positioned so that the lines connecting these three axes form a triangle. The first motor-generator MG1 provided on the first axis A1, the second motor-generator MG2 provided on the second axis A2, and the differential unit 18 provided on the fourth axis A4 are positioned radially adjacent to each other. Moreover, the third axis A3 is positioned within the triangle formed by connecting the three axes, that is, the first axis A1, the second axis A2, and the fourth axis A4, so that a first gear 14 of the counter deceleration mechanism C meshes with the output gear 12 and an output gear 13 of the second motor-generator MG2, and that a second gear 16 meshes with a differential input gear 17 of the differential unit 18.

2. Structure of the Drive Mechanism

The structure of the drive mechanism included in the hybrid drive device 1 of the present embodiment will be described below. As shown in FIGS. 1 and 2, one end of the input shaft I is connected to the engine output shaft Eo of the engine E (on the right side in FIG. 1 hereinafter "right end"). The engine E is herein an internal combustion engine that is driven by burning fuel. For example, various known engines, such as a gasoline engine and a diesel engine, may be used as the engine E. A damper 11 is inserted between the engine output shaft Eo and the input shaft I of the hybrid drive device 1. The damper 11 transmits rotation, generated by driving the engine E, to the input shaft I while absorbing torsional vibration between the engine output shaft Eo and the input shaft I. The input shaft I may be connected directly to the engine E, or be connected to the engine E through a structure other than the damper, such as a clutch. The input shaft I is connected to rotate integrally with a carrier ca of the planetary gear unit P.

The first motor-generator MG1 has a first stator St1 fixed to the case 2, and a first rotor Ro1 rotatably supported radially inside the first stator St1. The first rotor Ro1 of the first motor-generator MG1 is connected to rotate integrally with a sun gear s of the planetary gear unit P. The first motor-generator MG1 is electrically connected to an electricity accumulating device (not shown), such as a battery or a capacitor, through the control device 21. The first motor-generator MG1 may function as a motor (an electric motor) that generates motive power when supplied with electric power, and as a generator (an electric generator) that generates electric power when motive power is input. In this example, the first motor-generator MG1 mainly functions as a generator for generating electric power by a driving force of the input shaft (the engine E) received through the planetary gear unit P, to charge the electricity accumulating device, or to supply electric power for driving the second motor-generator MG2. During high-speed travel of the vehicle 7, starting of the engine E, or the like, however, the first motor-generator MG1 sometimes functions as a motor that outputs a driving force.

The second motor-generator MG2 has a second stator St2 fixed to the case 2, and a second rotor Ro2 rotatably supported radially inside the second stator St2. The second rotor Ro2 of the second motor-generator MG2 is connected so as to rotate integrally with the second motor-generator output gear 13. The second motor-generator output gear 13 is connected to the first gear 14 of the counter deceleration mechanism C by meshing with the first gear 14. In the present embodiment, the second motor-generator output gear 13 function as a "second rotating electrical machine output gear" of the present invention. The second motor-generator MG2 is electrically connected to the electricity accumulating device (not shown), such as a battery or a capacitor, through the control device 21. Like the first motor-generator MG1, the second motor-generator MG2 may function as a motor (an electric motor) that generates motive power when supplied with electric power, and as a generator (an electric generator) that generates electric power when motive power is input. In this example, the second motor-generator MG2 mainly functions as a motor for supplementing a driving force of the vehicle 7 once in motion. During deceleration of the vehicle 7, or the like, however, the second motor-generator MG2 may also be employed as a generator for regenerating an inertial force of the vehicle 7 as electric energy.

In the present embodiment, a first rotational position sensor 61 is provided adjacent to the first rotor Ro1 of the first motor-generator MG1. The first rotational position sensor 61 detects the rotational position of the first rotor Ro1. In addition, a second rotational position sensor 62 is provided adjacent to the second rotor Ro2 of the second motor-generator MG2. The second rotational position sensor 62 detects the rotational position of the second rotor Ro2. Specifically, a resolver or the like is used as the first rotation sensor 61 and the second rotation sensor 62.

The planetary gear unit P is coaxial with the input shaft I, and includes three rotating elements, that is, a first rotating element, a second rotating element, and a third rotating element. In the present embodiment, the planetary gear unit P is formed by a single-pinion type planetary gear mechanism that includes a carrier ca, which rotatably supports a plurality of pinion gears, and sun gear s and a, ring gear r which mesh with the pinion gears. The sun gear s rotates integrally with the first rotor Ro1 of the first motor-generator MG1. The carrier ca is connected to rotate integrally with the input shaft I. The ring gear r serves as an output rotating element, and rotates integrally with the output gear 12 which is provided at a position which is more proximal to the engine E than the ring gear r is (hereinafter, referred to as "the right position" in FIG. 1), and which is coaxial with the input shaft I. In the present embodiment, provided that the three rotating elements of the planetary gear unit P are respectively the first rotating element, the second rotating element, and the third rotating element in order of rotational speed, the sun gear s serves as the "first rotating element," the carrier ca c serves as the "second rotating element," and the ring gear r serves as the "third rotating element" in the present invention.

The planetary gear unit P distributes the rotational driving force of the input shaft I (the engine E) to the output gear 12 and the first motor-generator MG1. That is, the carrier ca of the planetary gear unit P rotates integrally with the input shaft I (the engine E). The rotation of the carrier ca is then distributed to the sun gear s that functions as one rotating element of the planetary gear unit P, and the ring gear r that functions as another rotating element of the planetary gear unit P. Rotation distributed to the ring gear r is transmitted to the output gear 12, and rotation distributed to the sun gear s is transmitted to the first rotor Ro1 of the first motor-generator MG1. At this time, the engine E outputs torque in the positive direction according to a driving force requested from the vehicle side, while being controlled to maintain a high efficiency, low exhaust gas state (so as to generally conform to optimal fuel consumption characteristics), and the torque is transmitted to the carrier ca through the input shaft I. In contrast, the first motor-generator MG1 outputs torque in a negative direction to transmit the reaction force of the torque of the input shaft I to the sun gear s. That is, the first motor-generator MG1 functions as a reaction-force receiver for supporting the reaction force of the torque of the input shaft I, whereby the torque of the input shaft I is distributed to the output gear 12. Accordingly, the rotational speed of the output gear 12 is determined by the rotational speed of the first motor-generator MG1. The output gear 12 is meshed with the first gear 14 of the counter deceleration mechanism C.

As shown in FIG. 1, the counter deceleration mechanism C includes the first gear 14 that meshes with the output gear 12, the second gear 16 that meshes with the differential input gear 17, and a counter shaft 15 that connects the first gear 14 to the second gear 16. The rotation axis (the third axis A3) of the counter shaft 15 is positioned parallel to the input shaft (the first axis A1) and is different from the axis of the input shaft. The second gear 16 is herein set to have a smaller diameter and a smaller number of teeth than the first gear 14. Thus, rotation of the first gear 14 is reduced in terms of the number of teeth, and transmitted to the second gear 16. Moreover, in the present embodiment, the second gear 16 is provided at a position that is more proximal to the engine than the first gear 14 is. This enables an axial central portion of the counter shaft 15 to be provided at a position that is more proximal to the engine than the output gear 12 is. Moreover, the second motor-generator output gear 13 meshes with the first gear 14. That is, both the output gear 12 and the second motor-generator output gear 13 mesh with the first gear 14. Rotation of the output gear 12 and the second motor-generator output gear 13 are transmitted to the output gear 14, and are also transmitted to the differential unit 18 through the counter shaft 15 and the second gear 16.

The differential unit 18 includes the differential input gear 17 that meshes with the second gear 16. The differential unit 18 distributes the rotational driving force transmitted to the differential input gear 17, to two driving wheels 6 through the output shaft O. As described above, the rotational driving force of the engine E, the first motor-generator MG1, and the second motor-generator MG2 is transmitted to the counter deceleration mechanism C (the second gear 16). Thus, the hybrid drive device 1 of the present embodiment transmits the rotational driving force generated by the engine E, the first motor-generator MG1, and the second motor-generator MG2 and transmitted to the differential input gear 17, the output shaft O and the two driving wheels 6 through the differential unit 18, thereby enabling the vehicle 7 to move. More specifically, the hybrid drive device 1 enables the vehicle 7 to move by switching the operation mode to a motor drive mode in which only the second motor-generator MG2 is driven, a hybrid drive mode in which all of the engine E, the first motor-generator MG1, and the second motor-generator MG2 are driven, or the like.

Moreover, in the present embodiment, as shown in FIG. 1, the differential input gear 17 is provided at a position that is more proximal to the engine than a central portion 18a of the differential unit 18 is. This arrangement enables the second gear 16, which meshes with the differential input gear 17, to be provided at a position which is closer to the engine, and thus, enables the counter shaft 15 and the first gear 14, which are connected to the second gear 16, the output gear 14, which meshes with the first gear 12, and the like to be provided at the position which is closer to the engine.

The input shaft I, the first motor-generator MG1, the second motor-generator MG2, the planetary gear unit P, the output gear 12, the counter deceleration mechanism C, the differential unit 18, and the output shaft O are accommodated in the case 2. The case 2 includes a case peripheral wall 40 that covers the outer peripheries of the components accommodated in the case 2, a first end support wall 41 that closes the end opening formed in the face of the case peripheral wall 40 that is distal from the engine E, and a second end support wall 43 that closes an end opening formed in the face of the case peripheral wall 40 that is proximal to the engine E. The first end support wall 41 is herein provided at a position which is more distal from the engine than the first motor-generator MG1 is, and the second end support wall 43 is provided at a position which is more proximal to the engine than the output gear 12 is. This case 2 further includes a first intermediate support wall 42 provided between the output gear 12 and the planetary gear unit P in the axial direction, and a second intermediate support wall 45 provided between the second motor-generator MG2 and the counter deceleration mechanism C. In the present embodiment, the first end support wall 41 and the second intermediate support wall 42 of the case 2 serves as the "fixing member" and "intermediate fixing member" in the present invention, respectively.

Moreover, in the present embodiment, the case 2 may be split into a main case 2a, a first cover 2b that is attached to the face of the main case 2a that is distal from the engine, and a second cover 2c that is attached to the face of the main case 2a that is proximal to the engine. The case peripheral wall 40 is herein formed in the main case 2a, and the main case 2a is structured to accommodate main components of the hybrid drive device 1. Moreover, in the illustrated example, the first intermediate support wall 42 and the second intermediate support wall 45 are formed integrally with the main case 2a (the case 2). Moreover, both axial ends of the main case 2a are opened, and the components to be accommodated in the case 2 are installed and assembled through these openings. On the first axis A1, the input shaft I and the output gear 12 are inserted and assembled from the face of the main case 2a which is proximal to the engine (i.e., the face of the main case 2a on the right hand side in FIG. 1), and the planetary gear unit P and the first motor-generator MG1 are inserted and assembled from the face of the main case 2a which is distal from the engine (i.e., the face of the main case 2a on the left hand side in FIG. 1). On the second axis A2, the second motor-generator MG2 is inserted and assembled from the face of the main case 2a which is distal from the engine, and on the third axis A3, the counter deceleration mechanism C is inserted and assembled from the face of the main case 2a which is proximal to the engine.

After these components are accommodated, the first cover 2b is attached to the face of the main case 2a which is distal from the engine, and the second cover 2c is attached to the face of the main case 2a which is proximal to the engine. The first end support wall 41 is herein formed in the first cover 2b, and the second end support wall 43 is formed in the second cover 2c. Moreover, a pump cover 44, which is formed by a separate member from the second cover 2c (the case 2), is brought into contact with a step portion formed in the inner peripheral surface of the second cover 2c, from the side which is distal from the engine, and is thus integrally attached to the second cover 2c. A pump chamber is formed between a side surface on the face of the second end support wall 43 which is distal from the engine, and the attached pump cover faces the face of the second end support wall 43, and an oil pump 19 is provided in the pump chamber.

Because the second cover 2c is attached after the output gear 12 is installed from the face of the main case 2a that is proximal to the engine, the oil pump 19 is herein provided at a position which is more proximal to the engine E than the output gear 12 is. As described above, in the present embodiment, the output gear 12 meshes with the first gear 14 that forms the counter deceleration mechanism C, and the second gear 16 is provided at a position which is more proximal to the engine E than the first gear 14 is Thus, at the position which is more proximal to the engine than the output gear 12 is on the first axis A1, a space (a dead space) is provided on the radially outer side of the second gear 16 (i.e., on the plane which is perpendicular to the axis of the second gear 16, and on which the second gear 16 is present). Thus, by providing the oil pump 19 in this space, the space inside the hybrid drive device 1 is effectively used, whereby an increase in overall size of the device is suppressed. Note that attachment of the first cover 2b and the second cover 2c to the main case 2a, and attachment of the pump cover 44 to the second cover 2c are performed by using, for example, fastening members such as bolts.

In the present embodiment, the oil pump 19 is an internal gear pump having an inner rotor and an outer rotor. Moreover, the oil pump 19 is provided coaxially with the input shaft I, and a shaft core portion of the inner rotor is connected to the input shaft I so that the inner rotor rotates integrally with the input shaft I. With rotation of the input shaft I, the oil pump 19 discharges a lubricant to generate an oil pressure for supplying the lubricant to portions to be lubricated, such as the planetary gear unit P, the output gear 12, and the counter deceleration mechanism C. Note that an axial oil passage and a radial oil passage are formed in the axial direction and the radial direction, respectively, inside the pump cover 44, the input shaft I, the sun gear s, and the like, so that the lubricant discharged from the oil pump 19 are supplied through these oil passages to the portions to be lubricated. The lubricant discharged from the oil pump 19 is supplied for purposes such as cooling of the first motor-generator MG1 and the second motor-generator MG2.

Moreover, the hybrid drive device 1 includes the control device 21 for controlling at least one of the first motor-generator MG1 and the second motor-generator MG2. In the present embodiment, the control device 21 is structured to control both the first motor-generator MG1 and the second motor-generator MG2. The control device 21 is structured to include at least an inverter unit (not shown). The inverter unit herein includes a bridge circuit formed by at least three sets of switching elements, that is, at least six switching elements, and converts between direct current power and alternating current power. In addition to the inverter unit, the control device 21 may be structured to include, for example, a smoothing condenser for smoothing the input power source from the electricity accumulating device to supply the smoothed input power source to the inverter unit, a reactor for forming a booster circuit to boost an input voltage from the electricity accumulating device, and the like. The components of the control device 21 are electrically connected to each other.

As shown in FIG. 2, the control device 21 is fixed inside a control device case 3 that is provided adjacent to the case 2. The control device case 3 is formed by a main case 3a, that is attached to the first cover 2b of the case 2 and that accommodates components of the control device 21, an attached upper cover 3b that closes an upper opening of the first cover 2b and the main case 3a, and an attached lower cover 3e that closes a lower opening of the first cover 2b and the main case 3a. Moreover, the control device 21 is electrically connected to the first motor-generator MG1 and the second motor-generator MG2 through a connection member 22 axially extending through the first cover 2b. The connection member 22 is made of a conductive material such as copper, and in the illustrated example, is a conductor plate. A space between the first cover 2b and the connection member 22 is maintained in a liquid tight state so that the lubricant circulating in the case 2 does not leak into the control device case 3.

3. Arrangement of the Components

The arrangement of the components in the hybrid drive device 1 will be described below. The following description will focus on arrangement of the components on the first axis A1, and arrangement of the control device 1.

3-1. Arrangement of the Components on the First Axis

As described above, the output gear 12, the planetary gear unit P, and the first motor-generator MG1 are arranged coaxially with the input shaft I. These components are sequentially arranged in the order of the output gear 12, the planetary gear unit P, and the first motor-generator MG1 from the right side in FIG. 1 (from the end of the input shaft connected to the engine E). The planetary gear unit P is positioned radially inside the first motor-generator MG1 and is provided at the same position as at least a part of the first motor-generator MG1. In the other words, the planetary gear unit P is coaxially nested with the first motor-generator MG1.

As shown in FIGS. 1 and 2, the first motor-generator MG1 is provided at the position which is more distal from the engine than the output gear 12 is, and axially outside the planetary gear unit P that is also provided at the position which is more distal from the engine than the output gear 12 is. The first stator St1 of the first motor-generator MG1 is fixedly in contact with a step portion formed in the inner peripheral surface of the case peripheral wall 40 of the case 2. The first rotor Ro1 is integrally connected to the sun gear s of the planetary gear unit P through a first rotor connection member 31, and is supported by the first rotor connection member 31 so as to be positioned radially outside the planetary gear unit P.

The first rotor connection member 31 extends radially inward from the first rotor Ro1, and in the present embodiment, is a disc-shaped member, and having a circular hole in its radial center. The first rotor connection member 31 is provided adjacent to the side of the planetary gear unit P which is distal from the engine. The first rotor Ro1 is fixed to a radial outer end of the first rotor connection member 31, and the sun gear s of the planetary gear unit P is fixed to a radial inner end of the first rotor connection member 31. Moreover, in the present embodiment, the first rotor connection member 31 is shaped to integrally include a cylindrical portion 31a that protrudes axially from the disc-shaped member. The cylindrical portion 31a supports the inner peripheral surface of the first rotor Ro1. The cylindrical portion 31a protrudes to the planetary gear unit P side, and the inner peripheral surface of the first rotor Ro1 contacts the outer peripheral surface of the cylindrical portion 31a.

As described above, a space surrounded by the inner peripheral surface of the first rotor Ro1 (in this example, the inner peripheral surface of the cylindrical portion 31a) and the first rotor connection member 31 is formed radially inside the first rotor Ro1 by fixing the first rotor Ro1 to the radial outer end of the first rotor connection member 31. This space opens toward the engine E side (toward the right side in FIG. 1), and the planetary gear unit P is entirely or partially accommodated in this space. Thus, providing the planetary gear unit P in the space formed radially inside the first rotor Ro1 of the first motor-generator MG1 reduces the axial length of the first axis A1 as compared to the case where the planetary gear unit P and the first motor-generator MG1 are aligned on the first axis A1. Moreover, because the outer diameter of the first motor-generator MG1 is increased by providing the planetary gear unit P radially inside the first motor-generator MG1, the axial length required for the first motor-generator MG1 to output an equivalent rotational driving force is reduced. As a result, the axial length of the first axis A1 can further be reduced.

The first rotor Ro1 of the first motor-generator MG1 is rotatably supported at two axial positions. In the present embodiment, the first rotor Ro1 is supported by the case 2 at one of the two axial positions, and is supported by the input shaft I at the other axial position. More specifically, one portion of the first rotor Ro1, which is distal from the engine, is rotatably supported by the first end support wall 41 of the case 2 (the first cover 2b) through a first rotor bearing 53, and the other portion of the first rotor R o1, which is proximal to the engine, is rotatably supported by the input shaft I relative to the input shaft I, through a second rotor bearing 54. Note that, in the illustrated example, a ball bearing capable of supporting a relatively large load is used as the first rotor bearing 53. On the other hand, a needle bearing, which is capable of reducing the radial thickness to a relatively small value, is used as the second rotor bearing 54.

In the present embodiment, in order to support the first rotor connection member 31 and the first rotor Ro1 in the case 2 (the first cover 2b), the first rotor connection member 31 is shaped to integrally include a cylindrical, axially protruding portion 31b that protrudes axially from the disc-shaped member. The axially protruding portion 31b protrudes from the planetary gear unit P away from the engine E, in the other words, from the end of the input shaft I connected to the engine E (to the left side in FIG. 1). Moreover, the first end support wall 41 includes a cylindrical, axially protruding portion 41a that protrudes axially toward the first motor-generator MG1. The first rotor bearing 53 is provided on the outer peripheral surface of the axially protruding portion 41a of the first end support wall 41 to support the inner peripheral surface of the axially protruding portion 31b of the first rotor connection member 31. Thus, the first rotor Ro1 is rotatably supported by the first end support wall 41 of the case 2 (the first cover 2b) through the first rotor connection member 31, and the first rotor bearing 53 that is provided between the inner peripheral surface of the axially protruding portion 31b of the first rotor connection member 31 and the outer peripheral surface of the axially protruding portion 41a of the first end support wall 41. Thus, one portion of the shaft core of the first rotor Ro1, which is distal from the engine, can be located with high accuracy.

Moreover, in the present embodiment, a rotor of the first rotation sensor 61 is fixed to the outer peripheral surface of the axially protruding portion 31b of the first rotor connection member 31, and a stator of the first rotation sensor 61 is fixed to the surface on the first motor-generator MG1 side of an axially protruding portion 41b formed in the first end support wall 41 of the case 2 (the first cover 2b). The first rotor bearing 53 is provided between the axially protruding portion 31b of the first rotor connection member and the axially protruding portion 41a of the first end support wall 41. Thus, in this example, the first rotor bearing 53, the axially protruding portion 31b of the first rotor connection member, and the axially protruding portion 41a of the first end support wall 41 are on the same place that is perpendicular to the axis A1. Thus, in this example, the first rotation sensor 61 is provided on the radially outer side of the first rotor bearing 53. Thus, the first rotation sensor 61 is provided on the place which is perpendicular to the axis A, and on which the first rotor bearing 53 and the axially protruding portion 41a of the first end support wall 41 are present. Moreover, the first stator St1 of the first motor-generator MG1 is provided on the radially outer side of the first rotation sensor 61. Thus, the portion of the first stator St1, which is distal from the engine, is provided to be on the same plane which is perpendicular to the axis A1, and on which the first rotor bearing 53, the axially protruding portion 41a of the first end support wall 41, the axially protruding portion 31b of the first rotor connection member 31, and the first rotation sensor 61, are present In this example, these components are provided radially inside a coil end that protrudes from a core of the first stator St1 away from the engine, and are provided at the same position as the coil end in the axial direction of the input shaft. This arrangement facilitates the reduction of the axial dimension of the hybrid drive device 1.

Moreover, the portion of the first rotor Ro1 of the first motor-generator MG1, which is proximal to the engine, is supported by the input shaft I. In the present embodiment, the sun gear s includes an extended shaft portion 32 that extends toward the engine E (i.e., "the right side" in FIG. 1), and the input shaft I includes a hole portion 33 which is formed in the end portion of the input shaft I that is distal from the engine E, and which accommodates the extended shaft portion 32. The sun gear s is supported radially inside the input shaft I so as to be rotatable relative to the input shaft I through a second rotor bearing 54 provided between the outer peripheral surface of the extended shaft portion 32 and the inner peripheral surface of the hole portion 33. Thus, the potion of the first rotor Ro1 of the first motor-generator MG1, which is proximal to the engine, is compactly supported by using the second rotor bearing 54 of a relatively small diameter at a position close to the shaft core of the input shaft I. At this time, the use of the second rotor bearing 54 of a relatively small diameter reduces the cost of the bearing, whereby the total cost of the hybrid drive device 1 can be reduced.

The output gear 12 is provided at a position which is more proximal to the engine than the planetary gear unit P and the first motor-generator MG1 are, and the output gear 12 is provided coaxially with the planetary gear unit P and the first motor-generator MG1. The output gear 12 includes an output gear main body 12a that meshes with the first gear 14 of the counter deceleration mechanism C, and a cylindrical shaft portion 12b that extends toward both axial sides of the output gear main body 12a and has a cylindrical shape. The output gear main body 12a and the cylindrical shaft portion 12b are formed by a single part. The output gear main body 12a is formed as a gear of a relatively large diameter, which has a larger outer diameter than that of the planetary gear unit P. In the illustrated example, the output gear main body 12a has substantially the same diameter as that of the first rotor Ro1 of the first motor-generator MG1. The output gear main body 12a has a rim portion having a toothed outer peripheral surface, and a web portion having a smaller width than that of the rim portion. In the illustrated example, a parking gear 63 protrudes axially from the side surface of the web portion.

The cylindrical shaft portion 12b is formed as a cylindrical shaft portion of a relatively small diameter, which has a smaller outer diameter than that of the planetary gear unit P. The input shaft I is inserted through the shaft center of the cylindrical shaft portion 12b. In the illustrated example, the ring gear r of the planetary gear unit P is connected to the portion of the cylindrical shaft portion 12b, which is distal from the engine, through an output gear connection member 34. The output gear connection member 34 is provided so as to extend radially inward from the ring gear r of the planetary gear unit P. In the present embodiment, the output gear connection member 34 is a disc-shaped member provided along the radial direction and having a boss portion formed in its radial center. The output gear connection member 34 is provided adjacent to the side of the planetary gear unit P which is proximal to the engine. One axial end of the ring gear r is connected to a radial outer end of the output gear connection member 34, and the other axial end of the cylindrical shaft portion 12b is connected to a radial inner end of the output gear connection member 34. That is, the output gear main body 12a is connected to the ring gear r of the planetary gear unit P through the cylindrical shaft portion 12b and the output gear connection member 34, at a position radially outside the input shaft I. In the present embodiment, the cylindrical shaft portion 12b functions as a "connection portion" in the present invention.

The output gear 12 is rotatably supported by a pair of output bearings 51, 52. The pair of output bearings 51, 52 support the output gear 12 from both axial sides. Moreover, the cylindrical shaft portion 12b extending from both axial sides of the output gear main body 12a in the axial direction is rotatably supported by the case 2 through the output bearings 51, 52. The pair of output bearings 51, 52 are provided on the side of the planetary gear unit P that is proximal to the engine in the axial direction. Thus, in this example, the pair of output bearing 51, 52 are provided on the plane which is parallel to the axis A1, and on which the planetary gear unit P is present. In the illustrated example, the pair of output bearings 51, 52 have a smaller outer diameter than the outer diameter of the planetary gear unit P (the outer diameter of the ring gear r). Note that, in the illustrated example, ball bearings capable of supporting a relatively large load are used as the output bearings 51, 52.

As described above, the case 2 (the main case 2a) includes the first intermediate support wall 42 provided between the output gear 12 and the planetary gear unit P in the axial direction. Moreover, the pump cover 44 is integrally attached to the step portion formed in the inner peripheral surface of the case 2 (the second cover 2c). The first output bearing 51 is supported by the pump cover 44, and the second output bearing 52 is supported by the first intermediate support wall 42. Thus, one end portion of the output gear 12, which is distal from the engine, is rotatably supported by the first intermediate support wall 42 through the second output bearing 52 at a position radially outside the cylindrical shaft portion 12b, and the other end portion of the output gear 12, which is proximal to the engine, is rotatably supported by the pump cover 44 through the first output bearing 51 at a position radially outside the cylindrical shaft portion 12b. The pump cover 44 herein includes a cylindrical, axially protruding portion 44a that protrudes away from the engine (toward the output gear 12), and the first output bearing 51 is supported radially inside the axially protruding portion 44a. Moreover, the first intermediate support wall 42 includes a cylindrical, axially protruding portion 42a that protrudes axially toward the output gear 12, around the cylindrical shaft portion 12b of the output gear 12. The second output bearing 52 is supported radially inside the axially protruding portion 42a.

Moreover, the cylindrical shaft portion 12b has a through hole in its shaft center, and the input shaft I is inserted through the through hole. The input shaft I extends through the output gear 12, and is supported radially inside the cylindrical shaft portion 12b, with respect to the output gear 12 through a pair of input bearings 55, 56. That is, the input shaft I is supported by the pair of input bearings 55, 56 provided between the outer peripheral surface of the input shaft I and the inner peripheral surface of the through hole of the cylindrical shaft portion 12b, so that the input shaft I is rotatable relative to the output gear 12. Note that, in the illustrated example, needle bearings, which are capable of reducing the radial thickness to a relatively small value, are used as the input bearings 55, 56.

Thus, in the hybrid drive device 1 of the present embodiment, the end portion of the output gear 12, which is distal from the engine, is rotatably supported by the pump cover 44 that forms a part of the case 2, and the other end of the output portion, which is proximal to the engine, is rotatably supported by the first intermediate support wall 42 that also forms a part of the case 2. Thus, the shaft core of the output gear 12 can be located with high accuracy. Moreover, the input shaft I is supported radially inside the output gear 12 which is located with high accuracy, so that the input shaft I is rotatable relative to the output gear 12. Thus, the shaft core of the input shaft I can also be located with high accuracy. Moreover, the portion of the first rotor Ro1 of the first motor-generator MG1, which is distal from the engine, is rotatably supported by the first end support wall 41 that forms a part of the case 2, and the other portion of the first rotor Ro1, which is proximal to the engine, is supported by the input shaft I which is located with high accuracy, so that the first rotor Ro1 is rotatable relative to the input shaft I. Thus, the shaft core of the first rotor Ro1 can be located with relatively high accuracy, while facilitating a compact arrangement of the components.

Note that, as described above, in the present embodiment, the first axis A1 on which the input shaft I, the planetary gear unit P, and the first motor-generator MG1 are provided differs from the second axis A2 on which the second motor-generator MG2 is provided. Thus, providing the second motor-generator MG2 on a different axis from that of the first shaft I enables the axial length of the first axis A1 to be reduced as compared to the case where the planetary gear unit P, the first motor-generator MG1, and the second motor-generator MG2 are aligned on the first axis A1.

3-2. Arrangement of the Control Device

The control device 21 is provided at the position which is more distal from the engine (i.e., the end of the input shaft connected to the engine) than the output gear 12, the planetary gear unit P, and the first motor-generator MG1 are. Thus, the control device is provided at the position offset from the first motor-generator MG1 in the axial direction of the input shaft I. As described above, in this hybrid drive device 1, the planetary gear unit P is provided radially inside the first motor-generator MG1 to be at the same position as the first motor-generator MG1, i.e., to be coaxially nested with the first motor-generator MG1, whereby the axial length of the first axis A1 may be reduced in comparison to the case where the planetary gear unit P and the first motor-generator MG1 are aligned on the first axis A1. Moreover, the axial length of the first axis A1 may be further reduced by providing the second motor-generator MG2 on an axis different from that of the input shaft I. Thus, a space corresponding to the amount of reduction in axial length is produced at the position which is more distal from the engine E than the input shaft I is. In the present embodiment, the control device 21 is provided adjacent to the first motor-generator MG1 with the first cover 2b interposed therebetween. Thus, the space produced by reducing the axial length of the first axis A1 is effectively used, thereby suppressing an increase in overall size of the hybrid drive device 1.

In this example, as described above, the second motor-generator MG2 mainly functions as a motor that supplements the driving force of the vehicle 7. Thus, the second motor-generator MG2 is set to have a relatively large diameter and a long axial length so that it can output a large rotational driving force. Thus, the axial end portion of the second motor-generator MG2, which is distal from the engine, is provided at a position which is more distal from the engine than the axial end portion of the first motor-generator MG1 is. The control device 21 is herein provided on the radially outer side of the second motor-generator MG2. Thus, the control device 21 is provided on the place which is perpendicular to the axis A2, and on which the second motor-generator MG2 is present (i.e., the control device 21 and the motor-generator MG2 are axially overlaps). Thus, the overall axial length of the hybrid drive device 1 including the control device 21 may be reduced by an amount corresponding to the length of the axial overlap between the control device 21 and the second motor-generator MG2.

Moreover, as shown in FIG. 1, the control device 21 is provided on the left side of the first motor-generator MG1. Thus, the control device 21 is provided on the place which is parallel to the axis A1, and on which the first motor-generator MG1 is present. In the other words, at least a portion of the control device 21 is provided at the position that overlaps the first motor-generator MG1 when viewed along the rotational axis of the first motor-generator MG1. The control device 21 is provided at the position that does not overlap the second motor-generator MG2 at all when viewed along the rotational axis of the second motor-generator MG2. In the hybrid drive device 1 of the present embodiment, as described above, the axial length of the first axis A1 is reduced, while the axial length of the second axis A2 is increased in accordance with the size of the second motor-generator MG2. Thus, interference between the second motor-generator MG2 and the control device 21 in the axial direction is prevented by providing the control device 21 at a position that does not overlap the second motor-generator MG2 when viewed from the axial direction of the second axis A2. The control device 21 is appropriately disposed in the generated space by providing the control device 21 at a position that overlaps the first motor-generator MG1 when viewed from the axial direction of the first axis A1. Thus, an increase in the overall size of the hybrid control device 1 may be minimized.

Other Embodiments (1) The above embodiment was described with respect to an example in which the control device 21 controls both the first motor-generator MG1 and the second motor-generator MG2. However, embodiments of the present invention are not limited to this. That is, the control device 21 may control only one of the first motor-generator MG1 and the second motor-generator MG2. In this case, the other motor-generator MG is controlled by a second control device that is provided separately from the control device 21. The second control device may be provided at any position.

(2) The above embodiment was described with respect to an example in which the control device 21 is provided at the radially outer side of the second motor-generator MG2, and is provide at the same position as the part of the second motor-generator MG2 in the axial direction. However, embodiments of the present invention are not limited to this. That is, the control device 21 may not be provided at the same position as the second motor-generator MG2 in the axial direction. For example, if the axial length of the second motor-generator MG2 is reduced, and the side end of the first motor-generator MG1, which is distal from the engine, and the side end of the second motor-generator MG2, which is distal from the engine, are located substantially at the same position in the axial direction (i.e., the left side ends of the first motor-generator MG1 and the second motor-generator MG2 are on the same plane which is perpendicular to the axis A1 or A2, in FIG. 1), it is sufficiently possible to suppress an increase in overall size of the hybrid drive device 1 even if the control device 21 is not provided at the same position as the second motor-generator MG2 in the axial direction.

(3) The above embodiment was described with respect to an example in which the sun gear s includes the extended shaft portion 32 that extends toward the engine E, and the extended shaft portion 32 is supported radially inside the input shaft I so as to be rotatable relative to the input shaft I. However, embodiments of the present invention are not limited to this. That is, for example, the input shaft I may include an extended shaft portion that is axially extended away from the engine E, and the extended shaft portion of the input shaft I may is supported radially inside the sun gear s so as to be rotatable relative to the input shaft I (the sun gear s is supported radially outside the extended shaft portion of the input shaft).

(4) The above embodiment was described with respect to an example in which the first intermediate support wall 42 is formed integrally with the main case 2a (the case 2). However, embodiments of the present invention are not limited to this. That is, for example the first intermediate support wall 42 may be formed by a separate part from the main case 2a (the case 2), and integrally attached to the case 2.

(5) The above embodiment was described with respect to an example in which the hybrid drive device 1 includes the counter deceleration mechanism C and the differential unit 18, and the rotational driving force of the output gear 12 is transmitted to the output shaft O through the counter deceleration mechanism C and the differential unit 18. However, embodiments of the present invention are not limited to this. That is, one or both of the counter deceleration mechanism C and the differential unit 18 may be omitted from the hybrid drive device 1, and the rotational driving force of the output gear 18 is transmitted to the output shaft O directly or through only one of the counter deceleration mechanism C and the differential unit 18.

(6) The above embodiment was described with respect to an example in which the counter deceleration mechanism C includes the first gear 14, the second gear 16, and the counter shaft 15 that connects the first gear 14 to the second gear 16, and both the output gear 12 and the second motor-generator output gear 13 mesh with the first gear 14. However, embodiments of the present invention are not limited to this. That is, for example, the counter deceleration mechanism C may further include a third gear, so that only the output gear 12 meshes with the first gear 14, and the second motor-generator output gear 13 meshes with the third gear.

(7) The above embodiment was described with respect to an example in which the second gear 16 of the counter deceleration mechanism C is provided at the position which is more proximal to the engine E than the first gear 14 is. However, embodiments of the present invention are not limited to this. That is, the second gear 16 may be provided at the position which is more distal from the engine than the first gear 14 is.

(8) The above embodiment was described with respect to an example in which the oil pump 19 is provided coaxially with the input shaft I, and is provided at the position which is more proximal to the engine than the output gear 12 is. However, embodiments of the present invention are not limited to this. That is, the oil pump 19 may be provided at any position, for example, the oil pump 19 may be provided in a free space located on an axis other than that of the input shaft I.

(9) The above embodiment was described with respect to an example in which the differential input gear 17 is provided at the position which is more proximal to the engine than the axial central portion 18a of the differential unit 18 is. However, embodiments of the present invention are not limited to this. That is, the differential input gear 17 may also be provided at the position which is more distal from the engine than the axial central portion 18a of the differential unit 18 is.

(10) The above embodiment was described with respect to an example in which the planetary gear unit P is formed by a single-pinion type planetary gear mechanism, and the first motor-generator MG1 is connected to the sun gear s, the input shaft I is connected to the carrier ca, and the output gear 12 is connected to the ring gear r. However, embodiments of the present invention are not limited to this. That is, for example, the planetary gear unit P may be a double-pinion type planetary gear mechanism, or a combination of a plurality of single-pinion type or double-pinion type planetary gear mechanisms.

(11) The above embodiment was described with respect to an example in which the drive device of the present invention is applied to the hybrid drive device 1 for an FF (Front Engine Front Drive) vehicle. However, embodiments of the present invention are not limited to this. That is, the present invention is suitable as a structure that can be used in the hybrid drive device 1 that is provided adjacent to the transversely mounted engine E in the vehicle 7 in the width direction of the vehicle 7, and is connected in the axial direction of the output shaft Eo of the engine E. For example, the drive device of the present invention may be applied to an RR (Rear Engine Rear Drive) vehicle, an MR (Midship Engine Rear Drive) vehicle, and the like.

(12) In the embodiment of the invention described above, the drive device is provided adjacent to the engine E in the width direction of the vehicle, and the positional relationship between two components in the drive device is expressed using the engine as the reference (e.g. one of the components of the drive device is provided at a position more proximal to the engine than another component of the drive device is, and one of the components of the drive device is provided at a position more distal from the engine than another component of the drive device is). However, the structure to which the invention is applicable is not limited to the structure in which the engine is provided to one side of the drive device in the width direction of the vehicle. That is, the engine need not be provided to one side of the drive device in the width direction of the vehicle, and may be provided at any position as long as the engine is connected to the input shaft 1, shown in FIG. 1 or 2, in such a manner that a driving force is input in the input shaft I. Therefore, the description in the above embodiment that one of the components of the drive device is provided at a position more proximal to the engine than another component of the drive device is means that the one component is provided at a position more proximal to the end of the input shaft connected to the engine than the other component is. Similarly, the description in the above embodiment that one of the components of the drive device is provided at a position more distal from the engine than another component of the drive device is means that the one component is provided at a position more distal from the end of the input shaft connected to the engine than the other component is. Namely, the position of the engine relative to the drive device according to the invention is not particularly limited.

The invention claimed is:

1. A drive device, comprising:
an input shaft connected to an engine, the input shaft extending in a longitudinal direction and having a proximal end oriented nearest the engine in the longitudinal direction and a distal end oriented furthest from the engine in the longitudinal direction;
a first rotating electrical machine;
a second rotating electrical machine;
a planetary gear unit that includes a first rotating element connected to the first rotating electrical machine, a second rotating element connected to the input shaft, and a third rotating element that serves as an output rotating element;
an output gear connected to the output rotating element;
an output shaft that transmits rotation of the output gear to a driving wheel; and
a control device that electrically controls at least one of the first rotating electrical machine and the second rotating electrical machine, the control device positioned so as to be aligned with the first rotating electrical machine in the axial direction and at least partially aligned with the second rotating electrical machine in the radial direction,
wherein;
the output gear, the planetary gear unit, and the first rotating electrical machine are provided coaxially with the input shaft,
the planetary gear unit is provided radially inside the first rotating electrical machine, and is provided at the same position as at least a part of the first rotating electrical machine in the axial direction,
the second rotating electrical machine is provided on an axis different from the axes of the input shaft and the output shaft, and
the control device is positioned further in the longitudinal direction from the proximal end of the input shaft than the planetary gear unit and the first rotating electrical machine, is provided at a position that overlaps the first rotating electrical machine when viewed in an axial direction of the first rotating electrical machine, and provided radially outside the second rotating electrical machine, and is provided at the same position as at least a part of the second rotating electrical machine in the axial direction of the second rotating electrical machine.

2. The drive device according to claim 1, wherein
the control device is provided at a position that does not overlap the second rotating electrical machine when viewed in an axial direction of the second rotating electrical machine.

3. The drive device according to claim 1, further comprising:
a rotor connection member having a first end to which a rotor of the first rotating electrical machine is fixed, and a second end, which is provided radially inside the first end, to which a sun gear of the planetary gear unit is fixed.

4. The drive device according to claim 3, wherein
the first end of the rotor connection member is formed by a cylindrical portion that is coaxial with a rotational axis of the first rotating electrical machine,
an inner peripheral surface of the rotor of the first rotating electrical machine is fixed to an outer peripheral surface of the cylindrical portion,
at an intermediate point between a fixed point with the rotor and a fixed point with the sun gear, a second cylindrical portion, which is coaxial with the rotational axis of the first rotating electrical machine, is integrally provided on a face of the rotor connection member that is distal from the proximal end of the input shaft connected to the engine, and
the second cylindrical portion is rotatably supported by a fixing member through a bearing.

5. The drive device according to claim 1, wherein
the output gear and the planetary gear unit are sequentially arranged in this order from the proximal end of the input shaft connected to the engine, a rotor of the first rotating electrical machine is connected to a sun gear of the planetary gear unit, and a fixing member is attached to the rotor on a side of the rotor that is distal from the proximal end of the input shaft connected to the engine, and rotatably supports the rotor, and the sun gear is supported by the input shaft so as to be rotatable relative to the input shaft.

6. The drive device according to claim 5, wherein
the sun gear includes an extended shaft portion that extends toward the proximal end of the input shaft connected to the engine in the axial direction of the input shaft, and the extended shaft portion is supported radially inside the input shaft so as to be rotatable relative to the input shaft.

7. The drive device according to claim 5, further comprising:
   an intermediate fixing member provided between the output gear and the planetary gear unit in the axial direction of the input shaft,
   wherein the input shaft extends through the output gear, is supported radially inside the output gear so as to be rotatable relative to the output gear, and is connected to a carrier of the planetary gear unit, and
   the output gear is connected radially outside the input shaft to a ring gear of the planetary gear unit through a connection portion, and is supported radially outside the connection portion by the intermediate fixing member.

8. The drive device according to claim 1, further comprising:
   a differential gear unit having a differential input gear, for transmitting a rotational driving force of the differential input gear to the output shaft; and
   a first gear that meshes with the output gear, a second gear that meshes with the differential input gear, and a counter shaft that connects the first gear to the second gear, wherein
   the counter shaft is provided on an axis different from respective rotation axes of the input shaft, the output shaft, and the second rotating electrical machine.

9. The drive device according to claim 8, wherein
the second rotating electrical machine, the differential gear unit, and the counter shaft are provided on one side of a vertical plane, which includes a rotational axis of the first rotating electrical machine.

10. The drive device according to claim 8, wherein
the second rotating electrical machine and the differential gear unit are separately provided above and below a horizontal plane that includes a rotational axis of the first rotating electrical machine.

11. The drive device according to claim 8, wherein
a rotational axis of the counter shaft is positioned inside a triangle that is formed by connecting a rotational axis of the first rotating electrical machine, the rotational axis of the second rotating electrical machine, and a rotational axis of the differential gear unit.

12. The drive device according to claim 8, wherein
an output gear of the second rotating electrical machine, which is connected to a rotor of the second rotating electrical machine, meshes with the first gear.

13. The drive device according to claim 8, wherein
the second gear and the proximal end of the input shaft which is connected to the engine is provided on one side of a vertical plane, which is perpendicular to the counter shaft, and the first gear is provided on the other side of the vertical plane.

14. The drive device according to claim 13, further comprising:
   an oil pump that is provided on the same axis as the input shaft and is provided at a position that is more proximal to the proximal end of the input shaft connected to the engine than the output gear is.

15. The drive device according to claim 8, wherein
in an axial direction of an output shaft in the differential gear unit, the differential input gear and the proximal end of the input shaft connected to the engine are provided on one side of a vertical plane, which is perpendicular to the output shaft of the differential gear unit, and on which an axial central portion of the differential gear unit is present.

16. The drive device according to claim 1, wherein
the output shaft and a rotation axis of the second rotating electrical machine are provided on one side of a vertical plane which includes the input shaft.

17. The drive device according to claim 1, wherein
the control device includes an inverter unit for performing conversion between direct current power and alternating current power.

* * * * *